March 29, 1949.　　T. H. LJUNGGREN ET AL　　2,465,542
CARRIAGE SHUTTLE LOCK MECHANISM
Filed March 26, 1945　　　　　　　　　　　　3 Sheets-Sheet 1
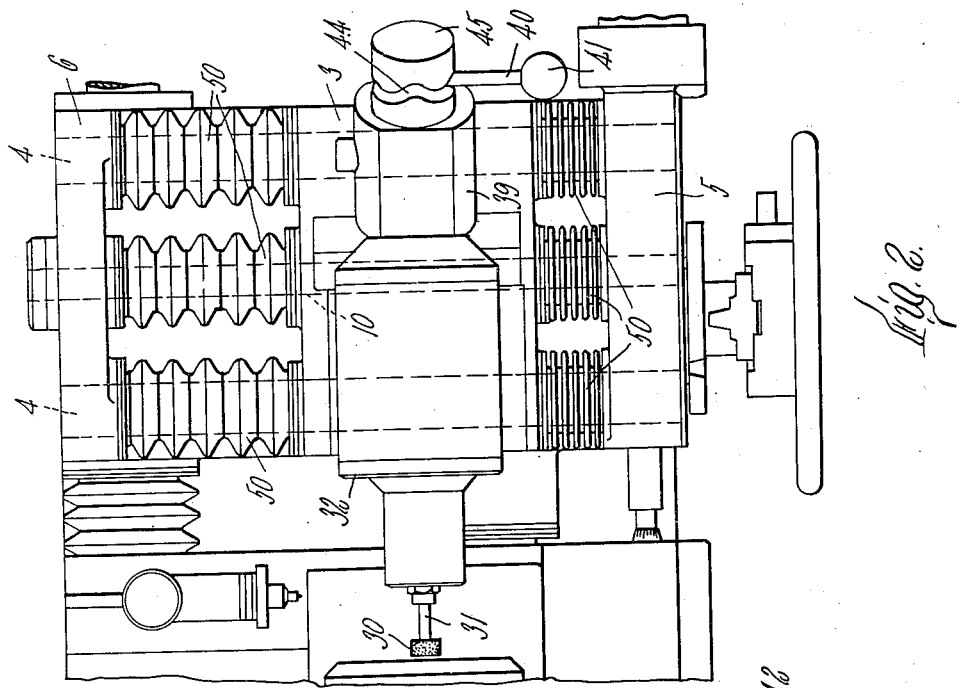
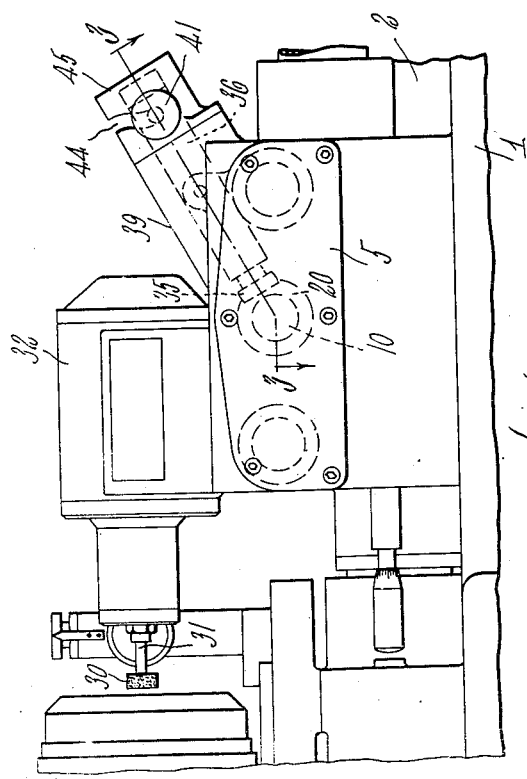
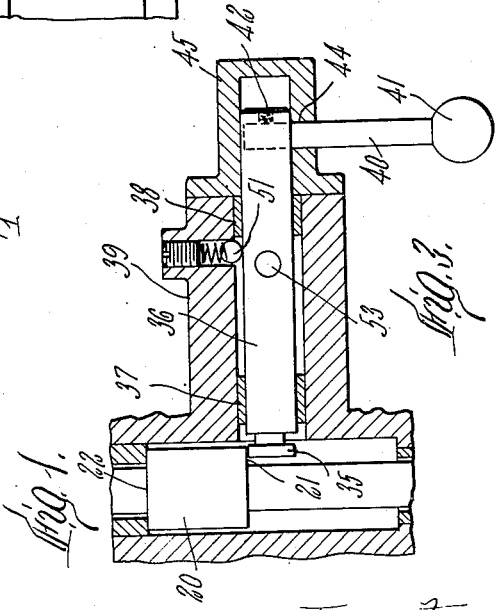

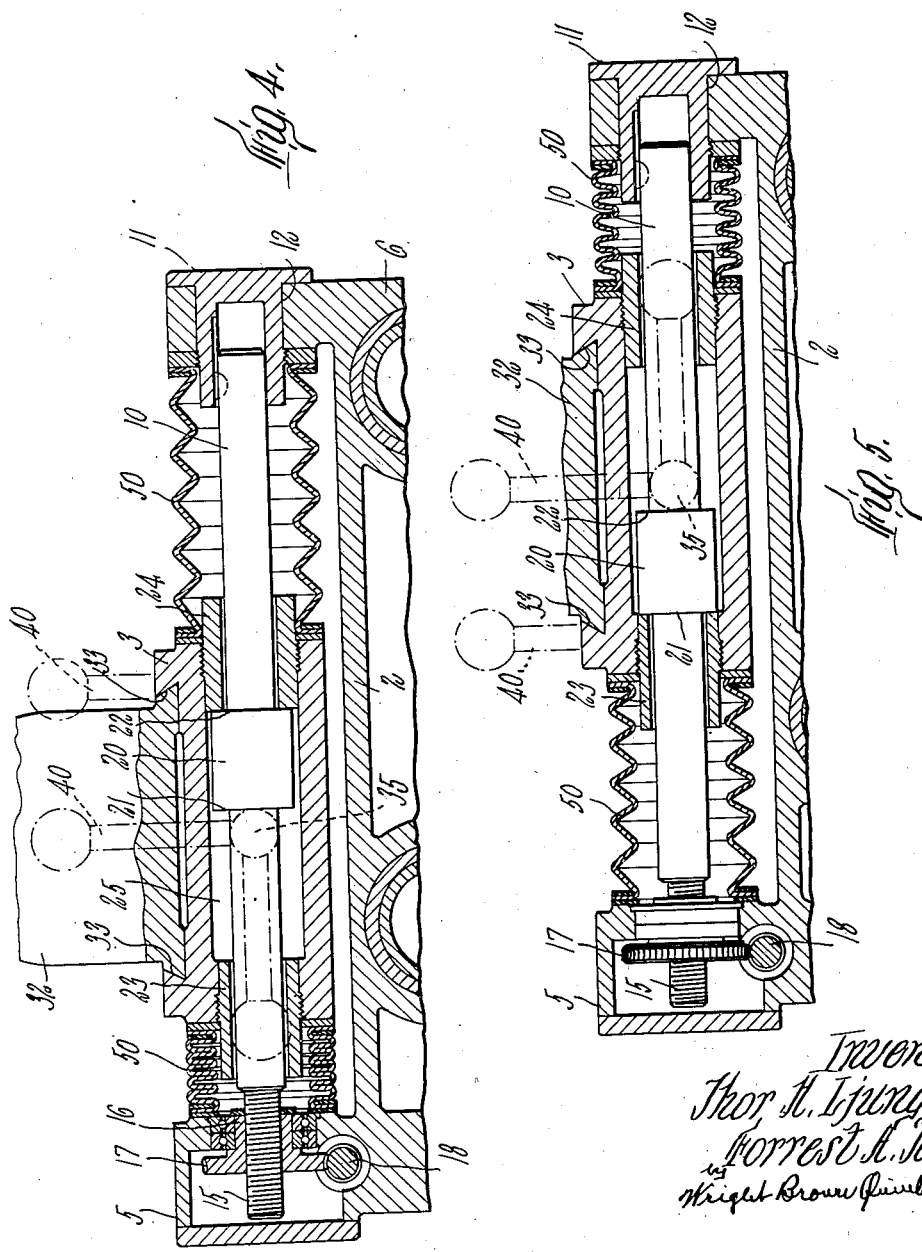

March 29, 1949. T. H. LJUNGGREN ET AL 2,465,542
CARRIAGE SHUTTLE LOCK MECHANISM
Filed March 26, 1945 3 Sheets-Sheet 3
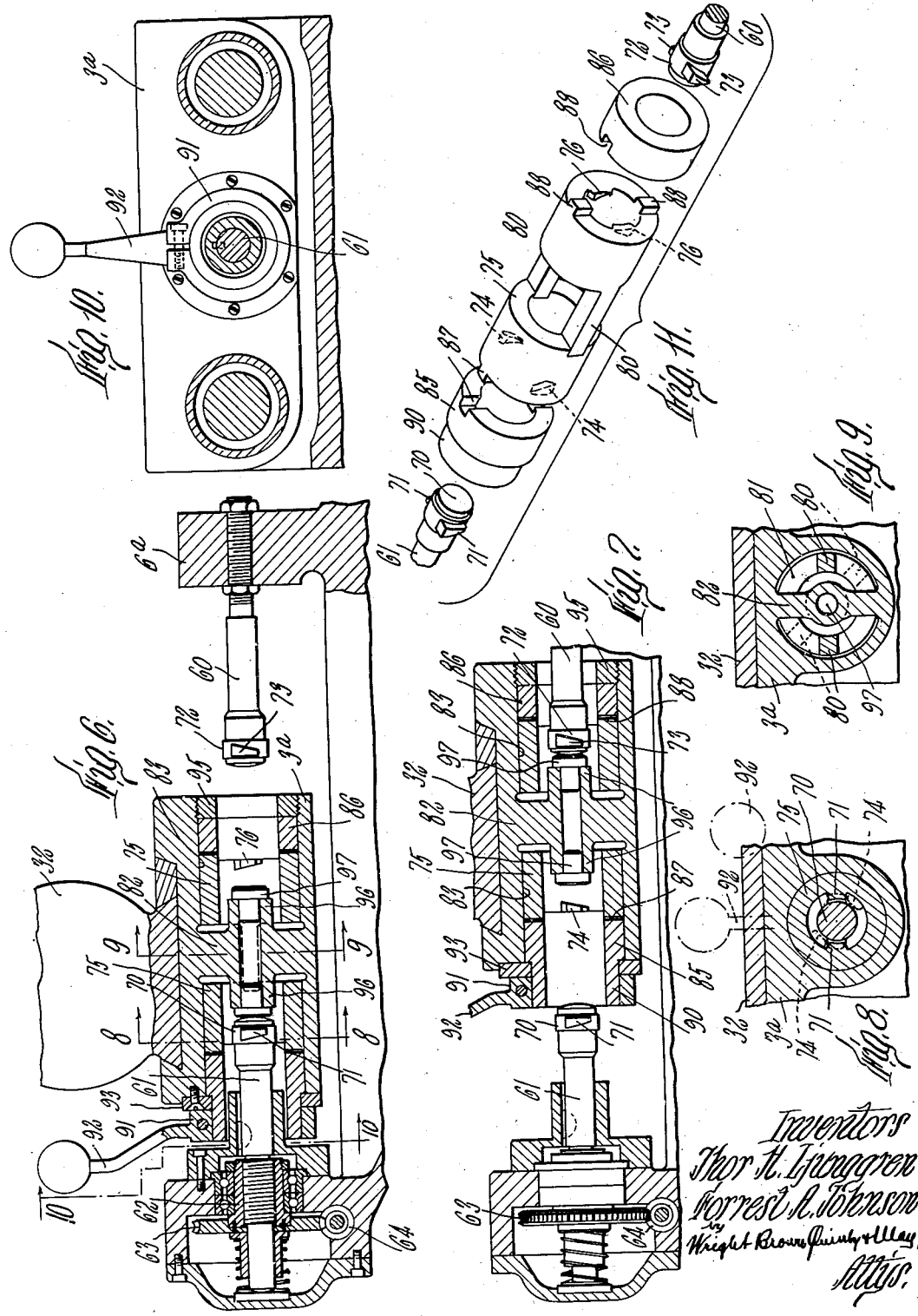
Inventors
Thor H. Ljunggren
Forrest A. Johnson Patented Mar. 29, 1949

2,465,542

UNITED STATES PATENT OFFICE 2,465,542

CARRIAGE SHUTTLE LOCK MECHANISM

Thor H. Ljunggren, Charlestown, N. H., and Forrest A. Johnson, Springfield, Vt., assignors to Bryant Chucking Grinder Company, Springfield, Vt., a corporation of Vermont Application March 26, 1945, Serial No. 584,948

13 Claims. (Cl. 51—2)

This invention relates to carriage feed mechanism and has for an object to provide means by which the operator may at will operatively disconnect the automatic feed mechanism from the carriage and retract the carriage and then, if desired, connect it either to the fed mechanism in another position or lock it in fixed position or return the carriage and operatively reconnect it to the automatic feed mechanism in the same relation in which it was before the disconnection was made.

A further object of the invention is to provide manually actuable means for operatively connecting and disconnecting the carriage and the automatic feed means, this manually actuated means also being actuable to move the carriage from and toward operative relation to the automatic feed mechanism or between two operative relations thereto.

Still another object of the invention is to provide manually actuable means which may be manually movable by a continuous motion to unlock the carriage from the automatic feed and to retract the carriage and there, if desired, to lock it to the automatic feed, or to return the carriage and automatically relock the carriage into operative relation to the feeding means.

Still another object is to provide means by which the carriage may be locked selectively either to the feed mechanism or in a predetermined retracted position.

For a more complete understanding of this invention, reference may be had to the accompanying drawings in which Figure 1 is a fragmentary front elevation of a grinding machine embodying the invention.

Figure 2 is a top plan view of the same.

Figure 3 is a detail sectional view on line 3—3 of Figure 1.

Figure 4 is a detail sectional view through the feed mechanism and carriage connections, the carriage being shown in its forward position.

Figure 5 is a view similar to a portion of Figure 4, but showing the carriage in its rearward position.

Figure 6 is a fragmentary view partly in transverse section and partly in elevation of a carriage and feed mechanism showing a further modification wherein the carriage may be locked selectively to the feed mechanism, or when in its rearward position to a fixed member, the carriage being shown locked to the feed mechanism.

Figure 7 is a view similar to a portion of Figure 6, but showing the carriage retracted and locked in fixed position.

Figures 8, 9 and 10 are detail sectional views on the correspondingly numbered section lines of Figure 6.

Figure 11 is an exploded isometric view of the cooperating parts of the locking mechanism and the feed and fixed element of the construction shown in Figures 6 to 10, inclusive.

Referring first to the construction shown in Figures 1 to 5, at 1 is shown a bed of a grinding machine having suitable ways along which a traversing carriage 2 is movable. On this traversing carriage is mounted a cross slide or carriage 3 which is mounted for motion transverse to the motion of the carriage 2. As shown the carriage 3 is mounted for sliding motion lengthwise of spaced guide bars 4 which are secured at their forward ends in an upstanding frame portion 5 of the carriage 2, and at their rear ends in a frame portion 6 of the same carriage. Since the particular mounting of the slide 3 is of no importance to this invention, further details are not shown herein.

Between the guide bars 4 is positioned a bar 10. The rear end of this bar 10 is keyed for sliding motion in a hollow guide plug 11 fitted into a socket 12 through the portion 6 of the traversing carriage 2.

The forward end portion of the bar 10 is shown as of reduced diameter and threaded as at 15 (see Figures 4 and 5) and this threaded portion has engaged thereon the internally threaded hub 16 of a worm wheel 17. The hub 16 is journaled against axial motion in the portion 5 of the slide 2 and it has meshing therewith a worm 18 by the turning of which the worm wheel may be turned and the bar 10 moved axially to a limited extent.

An intermediate portion of the bar 10 is provided with an enlarged diameter portion 20, the opposite ends of which form annular stop shoulders 21 and 22 which may be engaged against adjacent ends of a pair of spaced externally threaded sleeves 23 and 24 through which the bar 10 passes and which are threaded into opposite ends of a chambered portion 25 within the carriage 3 and which is of considerably greater length than the enlarged diameter portion 20 so that the abutment sleeves are spaced more widely than the shoulders 21 and 22.

Thus in the position shown in Figure 4, the forward end of the sleeve 24 is in engagement with the annular shoulder 22 of the portion 20, and in this position of the parts rearward axial motion of the bar 10 acts to move the carriage 3 rearwardly in a direction to feed the grinding wheel 30 toward the work. This grinding wheel 30 is carried by the spindle 31 of a grinding wheel head 32 mounted in ways 33 in the carriage 3 parallel to the traverse direction.

The part 10 may be locked in the position shown in Figure 4 with its annular shoulder 22 contacting the abutment sleeve 24, and as shown best in Figure 3, this is done by the engagement against the shoulder 21 of the portion 20, of a head 35 disposed eccentrically in relationship to the axis of a locking bolt 36. This locking bolt 36 is journaled in spaced bushings 37 and 38 in a tubular extension 39 inclined upwardly and laterally from the carriage 3.

The locking bolt 36 is movable axially as well as rocking about its axis so that its head 35 may be removed from alinement with the annular shoulder 21 as well as turned away from locking engagement therewith. To this end, the outer end portion of the bolt 36 has engaged therein the inner end of a handle 40 provided with an actuating knob 41 at its outer end. This handle 40 may be extended into a transverse hole in the bolt 36 and be held in position therein as by a set screw 42. The handle 40 projects through a curved slot forming a cam 44 in a cap 45 which normally closes the outer end of the tubular extension 39.

The cam 44 also is inclined axially so that when the handle 40 is in the position shown in Figures 1 and 3, it engages in the inmost portion at one end of the cam 44 and holds the bolt 36 in locking position. By swinging the handle 40 upwardly, however, the pressure of the eccentric head 35 against the shoulder 21 is first released and as the handle 40, being guided in the cam slot 44, is moved outward axially, the head 35 is axially withdrawn from the annular face 21, so that the carriage is now released from the bar 10 and may be moved rearwardly to the position shown in Figure 5 where the end of the sleeve 23 is in engagement with the shoulder 21 of the portion 20. In this position of the parts, the head 35 is brought just beyond the shoulder 22, so that by continuing the swing of the handle 40 beyond its upright position to its horizontal dash line position in Figure 5, the head 35 is brought inwardly and rocked into engagement with the shoulder 22, thus to lock the carriage 3 in a backward position where it is also under the feeding control of the bar 10 as produced by the rotation of the worm 18.

The backward motion of the carriage 3, after it is unlocked from its forward position by turning the handle 40 upward, may be produced by exerting continued backward pressure on the handle 40, the spring detent 51 engaging in a depression 53 in the bolt acting to prevent the head 35 from being moved inwardly until the carriage has reached its backward position, whereupon further pressure exerted on the handle when the motion of the carriage has been positively stopped wedges back the detent 51 thus freeing the handle 40 for completing its motion into a substantially horizontal position and locking the carriage 3 to its feed rod 10 in the back position.

Instead of locking the carriage in its rearward position to the feed mechanism, it may, if desired, be released from the feed mechanism entirely when in its forward position and caused to be locked to a fixed element in its rearward position. Such a construction is shown in Figures 6 to 11, inclusive. Referring to these figures, the traversing carriage has a fixed stop bar 60 secured to its rear upstanding member 6a, this bar 60 being spaced from but in axial alinement with a short feed bar 61, this feed bar 61 having threaded connection with the hub member 62 of the feed worm wheel 63 with which the worm 64 engages.

The rear end of the feed shaft 61 is provided with a head 70 carrying a plurality (herein shown as two) of wedge clutch elements 71 and similarly the forward end of the fixed bar 60 has a head 72 provided with wedge clutch elements 73. Arranged to cooperate at times with the clutch elements 71 are mating clutch elements 74 of a sleeve 75, and this sleeve 75 also carries a pair of clutch elements 76 which may engage the elements 73 of the fixed bar 60.

The sleeve 75 is made in two parts, one of them having a pair of diametrically disposed wing portions 80 which pass through annular slots 81 (see Figure 9) through a vertical web 82 in the cross slide carriage 3a and engage notches in the other sleeve part. The vertical web 82 partly separates a pair of alined tubular sockets 83 in the carriage 3a and they are coaxial with the bars 60 and 61. Each of these sockets 83 is cylindrical and has seated therein for rocking motion the two parts of the sleeve 75. The outer ends of this sleeve 75 are connected to outer sleeve portions 85 and 86 by lug and slot connections at 87 and 88, respectively, so that the sleeves 85 and 86 must rock with the sleeve 75. The sleeve 85 has a reduced diameter portion 90 around which may be clamped a split ring 91 integral with an actuating handle 92. This split ring 91 engages forwardly of a wear ring 93 secured to the forward end of the carriage 3a. The sleeve 86 is held in the rear portion of the socket 83 by an externally threaded ring 95 threaded into its rear end. It will be evident that with this construction, rocking of the handle 92 will serve to rock the assembly comprising the sleeves 85, 75 and 86 which are made separate for reasons of assembly. The central web 82 has a pair of oppositely disposed central bosses 96 which are perforated for the reception of headed wear and abutment plugs 97 adapted to cooperate with the heads 70 and 72 of the bars 61 and 60, respectively.

When the carriage 3a is in its forward position with one of the plugs 97 engaging the rear headed end 70 of the shaft 61 and the handle 92 is rocked into the upright position shown in Figure 8, the clutch lug 74 engages behind the lug 71 and locks the slide 3a to the feed rod 61. By turning the handle 92 downwardly to the inclined position shown in Figure 8, the locking lugs 74 are rocked out of contact with the lug 71, thus freeing the cross slide from the feed rod, whereupon by pushing rearwardly as against the handle 92, the slide 3a may be pushed backward away from the feed rod and with its back plug 97 into contact with the head 72 of the fixed rod 60. In this position of the carriage 3a, it may be locked to the fixed element 60 by pulling the handle 92 to its upright or locked position shown in Figure 8, whereupon the lugs 76 engage back of the lug 73 on the fixed element 60. With this construction it will be seen that the feed carriage may be locked either in a forward position in controlled relation to the feed bar, or in a rearward position locked in a fixed position. The motion of the handle 92 for locking or unlocking the carriage is transverse to its motion for moving the carriage forwardly or backwardly in this form of the invention.

From the foregoing description of certain embodiments of this invention, it should be evident to those skilled in the art that various other changes and modifications might be made without departing from the spirit or scope of this invention.

We claim:

1. In combination, a carriage, means supporting said carriage for linear motion, a carriage moving means, mechanism for selectively coupling or uncoupling said carriage and said moving means, and means operator-actuable to uncouple said carriage from said carriage-moving means and to move said carriage along said supporting means and to couple said carriage to said moving means in a second relative position.

2. In combination, a carriage, means supporting said carriage for linear motion, means for moving said carriage along said supporting means, a fixed element, and means selectively actuable to couple said carriage to said moving means or to said element.

3. In combination, a carriage, means supporting said carriage for linear motion, carriage moving means, a lever pivoted to said carriage, means for releasably coupling said carriage to said moving means, and operative connections from said lever to said coupling means causing swinging of said lever in the general direction of said linear motion to first release said coupling means and thereafter to move said carriage away from coupling position with said moving means, and reverse motion of said lever to first move said carriage toward coupling relation to said moving means and then to actuate said coupling means to couple said carriage to said moving means.

4. In combination, a carriage, means supporting said carriage for linear motion, carriage moving means, a lever pivoted on said carriage, means for releasably coupling said carriage to said moving means, and operative connection from said lever to said coupling means causing swinging of said lever in the general direction of said linear motion to first release said coupling means and thereafter to move said carriage away from coupling position with said moving means and to recouple said carriage to said moving means in a second position, and reverse motion of said lever to first uncouple said carriage from said moving means in said second position, to move said carriage toward coupling relation to said moving means in the first position and then to actuate said coupling means to couple said carriage to said moving means.

5. In combination, a carriage, means supporting said carriage for linear motion, carriage-moving means comprising a bar movable axially in the direction of such linear motion, said bar having a portion of enlarged cross section intermediate to its ends presenting a pair of shoulders spaced therealong, said carriage having abutments more widely spaced than said shoulders and arranged to be selectively engaged therewith, and means actuable to clamp or release said carriage with either selected abutment in engagement with the corresponding shoulder.

6. In combination, a carriage, means supporting said carriage for linear motion, carriage-moving means comprising a bar movable axially in the direction of such linear motion, said bar having a portion of enlarged cross section intermediate to its ends presenting a pair of shoulders spaced therealong, said carriage having abutments more widely spaced than said shoulders and arranged to be selectively engaged therewith, a rockable and axially movable locking rod carried by said carriage transverse to said bar and having a portion projectable axially to engage the enlarged portion of said bar at the end opposite to that engaging one of said abutments, means causing the rocking of said rod to move said rod axially into and out of locking position, and a handle secured to said rod and by motion of which said rod may be rocked and said carriage moved.

7. In combination, a carriage, means supporting said carriage for linear motion, carriage-moving means, a lever pivoted on said carriage, means for releasably coupling said carriage to said moving means, a fixed element, and operative connections from said lever to said coupling means causing swinging of said lever in the general direction of said linear motion away from eral direction of said linear motion away from said moving means to first release said coupling means from said moving means and to thereafter move said carriage away from coupling position with said moving means and to couple said coupling means to said fixed element, and reverse motion of said lever to first uncouple said coupling means from said fixed element, to then move said carriage toward coupling relation to said moving means, and then to actuate said coupling means to couple said carriage to said moving means.

8. In combination, a carriage, means supporting said carriage for rectilinear motion, an axially movable bar, means for moving said bar axially, a member rockably carried by said carriage coaxial with said bar, elements on said bar and member interengaging when said carriage is in one position relative to said bar and said member is in one angular position and coupling said carriage to said bar, said member when in another angular position being uncoupled from said bar, and a lever connected to said member actuable to rock said member from one to the other of said angular positions and when in unlocking angular position actuable to move said carriage from and toward coupling relation to said bar.

9. In combination, a carriage, means supporting said carriage for rectilinear motion, an axially movable bar, means for moving said bar axially, a fixed bar coaxial with and spaced from said axially movable bar, a member rockably carried by said carriage coaxial with said bars, elements on said movable bar and member interengaging when said carriage is in proper position with respect to one or the other of said bars and in one angular position coupling said carriage to one or the other of said bars, and a lever connected to said member and actuable to rock said member out of coupling relation to one of said bars and then to move said carriage to position for said member to cooperate with the other of said bars and then to rock said member to lock said carriage to said other bar.

10. In combination, a carriage, means supporting said carriage for rectilinear motion, an axially movable bar, means for moving said bar axially, a member rockably carried by said carriage, elements on said bar and member interengaging when said carriage is in one position relative to said bar and said member is in one angular position and coupling said carriage to said bar, said member when in another angular position being uncoupled from said bar, and a lever connected to said member actuable to rock said member from one to the other of said angular positions and when in unlocking angular position actuable to move said carriage from and toward coupling relation to said bar.

11. In combination, a carriage, means supporting said carriage for linear motion, a carriage moving means, actuating means for said moving means, mechanism for selectively coupling or uncoupling said carriage and said moving means, and means operator-actuable to uncouple said carriage from said carriage-moving means and to move said carriage along said supporting means away from said actuating means and to couple said carriage to said moving means in a second relative position.

12. In combination, a carriage, means supporting said carriage for linear motion, carriage moving means, actuating means for said moving means, a lever pivoted to said carriage, means for releasably coupling said carriage to said moving means, and operative connections from said lever to said coupling means causing swinging of said lever in the general direction of said linear motion away from said actuating means to first release said coupling means and thereafter to move said carriage away from coupling position with said moving means, and reverse motion of said lever to first move said carriage toward coupling relation to said moving means and then to actuate said coupling means to couple said carriage to said moving means.

13. In combination, a carriage, means supporting said carriage for linear motion, carriage moving means, actuating means for said moving means, a lever pivoted on said carriage, means for releasably coupling said carriage to said moving means, and operative connections from said lever to said coupling means causing swinging of said lever in the general direction of said linear motion away from said actuating means to first release said coupling means and thereafter to move said carriage away from coupling position with said moving means and to recouple said carriage to said moving means in a second position, and reverse motion of said lever to first uncouple said carriage from said moving means in said second position, to move said carriage toward coupling relation to said moving means in the first position and then to actuate said coupling means to couple said carriage to said moving means.

THOR H. LJUNGGREN.
FORREST A. JOHNSON.

REFERENCES CITED

The following references are of record in the file of this patent:

UNITED STATES PATENTS

| Number | Name | Date |
|---|---|---|
| 950,560 | Root | Mar. 1, 1910 |